(12) United States Patent
Ding et al.

(10) Patent No.: US 9,327,449 B2
(45) Date of Patent: May 3, 2016

(54) THREE DIMENSIONAL PRINTING APPARATUS

(71) Applicants: XYZprinting, Inc., New Taipei (TW); Kinpo Electronics, Inc., New Taipei (TW); Cal-Comp Electronics & Communications Company Limited, New Taipei (TW)

(72) Inventors: Ming-Hsiung Ding, New Taipei (TW); Peng-Yang Chen, New Taipei (TW); Wen-Ten Lin, New Taipei (TW)

(73) Assignees: XYZprinting, Inc., New Taipei (TW); Kinpo Electronics, Inc., New Taipei (TW); Cal-Comp Electronics & Communications Company Limited, New Taipei (TW)

( * ) Notice: Subject to any disclaimer, the term of this patent is extended or adjusted under 35 U.S.C. 154(b) by 83 days.

(21) Appl. No.: 14/255,966

(22) Filed: Apr. 18, 2014

(65) Prior Publication Data

US 2015/0165678 A1 Jun. 18, 2015

(30) Foreign Application Priority Data

Dec. 13, 2013 (TW) .............................. 102146218 A

(51) Int. Cl.
*B29C 59/16* (2006.01)
*B29C 67/00* (2006.01)
*B33Y 30/00* (2015.01)
(Continued)

(52) U.S. Cl.
CPC ......... *B29C 67/0062* (2013.01); *B29C 67/0085* (2013.01); *B33Y 10/00* (2014.12); *B33Y 30/00* (2014.12); *B29C 67/0088* (2013.01); *B29L 2009/00* (2013.01); *B33Y 50/02* (2014.12)

(58) Field of Classification Search
CPC ............ B29C 67/0062; B29C 67/0085; B29C 67/0088

USPC ............... 425/130, 174, 174.4, 218, 375, 447
See application file for complete search history.

(56) References Cited

U.S. PATENT DOCUMENTS 5,573,721 A 11/1996 Gillette
6,685,296 B2 * 2/2004 Mochizuki et al. ............. 347/19
(Continued)

FOREIGN PATENT DOCUMENTS

CN 202608063 12/2012
CN 102954826 3/2013
(Continued)

OTHER PUBLICATIONS

"Office Action of Taiwan Counterpart Application," issued on Nov. 23, 2015, p. 1-p. 4.
(Continued)

*Primary Examiner* — Joseph S Del Sole
*Assistant Examiner* — Thukhanh T Nguyen
(74) *Attorney, Agent, or Firm* — Jianq Chyun IP Office

(57) ABSTRACT

A three-dimensional printing apparatus including a tank, a moving platform, a light source disposed below the tank, a detecting unit and a control unit is provided. The tank is filled with a liquid forming material and a separating liquid, wherein the specific density of the separating liquid is larger than the specific density of the liquid forming material, so that the separating liquid sinks between the tank and the liquid forming material. The control unit controls an initial depth at which the moving platform immerses into the liquid forming material, so as to form a three-dimensional object. A three-dimensional printing apparatus is also provided, wherein the light source thereof is disposed above the tank, and the specific density of the liquid forming material is larger than the specific density of the separating liquid, so that the liquid forming material sinks between the tank and the separating liquid.

14 Claims, 4 Drawing Sheets

(51) Int. Cl.
*B33Y 10/00* (2015.01)
*B29L 9/00* (2006.01)
*B33Y 50/02* (2015.01)

(56) References Cited

U.S. PATENT DOCUMENTS 6,799,959 B1 * 10/2004 Tochimoto et al. ............ 425/130
2012/0130530 A1 * 5/2012 Yasukochi ................. 425/174.4

FOREIGN PATENT DOCUMENTS

GB 2477828 8/2011
WO 9415181 7/1994

OTHER PUBLICATIONS

"Office Action of Taiwan Counterpart Application", issued on Jan. 30, 2016, p. 1-p. 3.

* cited by examiner

THREE DIMENSIONAL PRINTING APPARATUS

CROSS-REFERENCE TO RELATED APPLICATION

This application claims the priority benefit of Taiwan application serial no. 102146218, filed on Dec. 13, 2013. The entirety of the above-mentioned patent application is hereby incorporated by reference herein and made a part of this specification.

BACKGROUND

1. Field of the Invention

The invention relates to a printing apparatus, and more particularly, to a three-dimensional printing apparatus.

2. Description of Related Art

With the increasing development of technology, many different technologies of constituting models layer by layer, such as additive manufacturing technology, are currently used for building physical three-dimensional (3-D) models. Generally, the additive manufacturing technology is to transform design information of 3-D model constituted by software, such as computer-aided design (CAD) software or the like, into a plurality of thin (quasi-two-dimensional) cross-sectional layers which are built on one another in succession. At the same time, a number of known techniques for forming the thin cross-sectional layers have been proposed. For instance, a printing module of a printing apparatus can usually be moved above a base along an XY-plane by reference to an XYZ-coordinate constructed from the virtual design data of 3D models, so as to extrude or deposit material in correct shape of the cross-sectional layer. The deposited material may then harden naturally or be cured by, for example, powerful light source, to form the desired cross-sectional layer. Therefore, by moving the printing module along a Z-axis layer by layer, a plurality of cross-sectional layers may gradually be stacked along the Z-axis, thereby enabling the deposit material to form a three-dimensional object in a layer by layer curing manner.

Taking for example the technique of forming the three-dimensional object by using a light source to cure the deposit material, the printing module is adapted to immerse into a liquid forming material filled within a tank, and the light source on a XY-plane irradiates the liquid forming material (viz. the deposit material), so that the liquid forming material can be cured and stacked on a moving platform of the printing module. As such, by moving the moving platform of the printing module along the Z-axis layer by layer, the liquid forming material may layer by layer be cured and stacked to form the three-dimensional object. In the process of forming the three-dimensional object through layer by layer stacking, if the three-dimensional object contacts the bottom of the tank following the movement of the moving platform, then the formed three-dimensional object is likely to be damaged due to contacting the bottom of the tank. In addition, if the cured liquid forming material adheres on the bottom of the tank, then the irradiation of the light source may likely to be affected and thereby influences the subsequent forming results. Therefore, under the current three-dimensional printing technique, how to provide the three-dimensional object obtained through three-dimensional printing with favorable printing quality has gradually become a focus of attention for the developers in the field.

SUMMARY OF THE INVENTION

The invention provides a three-dimensional printing apparatus with favorable printing quality.

The three-dimensional printing apparatus of the invention includes a tank, a moving platform, a light source, a detecting unit and a control unit. The tank is filled with a liquid forming material and a separating liquid, wherein a specific density of the separating liquid is larger than a specific density of the liquid forming material, and the separating liquid and the liquid forming material are immiscible with each other, so that the separating liquid sinks between the bottom of the tank and the liquid forming material. The moving platform is movably disposed above the tank. The light source is disposed below the tank so as to irradiate the liquid forming material. The detecting unit is disposed at a side of the tank and adapted to detect a junction between the separating liquid and the liquid forming material. The control unit is coupled to the light source, the detecting unit and the moving platform, wherein the control unit controls an initial depth at which the moving platform immerses into the liquid forming material according to the junction detected by the detecting unit. The control unit controls the moving platform to move from the initial depth in the liquid forming material layer by layer towards a direction away from the light source, and controls the light source to irradiate the liquid forming material, so as to cure the irradiated liquid forming material layer by layer, thereby forming a three-dimensional object on the moving platform.

Another three-dimensional printing apparatus of the invention includes a tank, a moving platform, a light source, a detecting unit and a control unit. The tank is filled with a liquid forming material and a separating liquid, wherein a specific density of the liquid forming material is larger than a specific density of the separating liquid, and the separating liquid and the liquid forming material are immiscible with each other, so that the liquid forming material sinks between the bottom of the tank and the separating liquid. The moving platform is movably disposed above the tank. The light source is disposed above the tank so as to irradiate the liquid forming material. The detecting unit is disposed at a side of the tank and adapted to detect a junction between the separating liquid and the liquid forming material. The control unit is coupled to the light source, the detecting unit and the moving platform, wherein the control unit controls an initial depth at which the moving platform immerses into the liquid forming material according to the junction detected by the detecting unit. The control unit controls the moving platform to move from the initial depth in the liquid forming material layer by layer towards a direction away from the light source, and controls the light source to irradiate the liquid forming material, so as to cure the irradiated liquid forming material layer by layer, thereby forming a three-dimensional object on the moving platform.

In one embodiment of the invention, the three-dimensional printing apparatus further includes a first injection module and a second injection module. The first injection module is connected to the tank, so as to inject a certain amount of the separating liquid into the tank, and when a liquid level position of the separating liquid is lower than a preset value, the control unit controls the first injection module to inject the separating liquid into the tank. The second injection module is connected to the tank, so as to inject a certain amount of the liquid forming material into the tank, and when a liquid level position of the liquid forming material is lower than a preset value, the control unit controls the second injection module to inject the liquid forming material into the tank.

In one embodiment of the invention, the first injection module has a first injection opening, and the second injection module has a second injection opening. The first injection opening and the second injection opening are respectively connected with the tank.

In one embodiment of the invention, the detecting unit includes an optical element disposed at the side of the tank. The optical element is adapted to move along an axial direction and to emit a ray of light towards the separating liquid and the liquid forming material. The axial direction is perpendicular to the junction between the separating liquid and the liquid forming material, and the light is parallel to the junction, so as to detect the junction through the reflection of the light.

In one embodiment of the invention, the detecting unit includes an ultrasonic element disposed below the tank. The ultrasonic element is adapted to emit an ultrasonic wave along an axial direction and towards the separating liquid and the liquid forming material, and the axial direction is perpendicular to the junction between the separating liquid and the liquid forming material, so as to detect the junction through the reflection of the ultrasonic wave.

In one embodiment of the invention, the detecting unit includes a floating ball disposed within the tank, and a specific density of the floating ball ranges between the specific density of the separating liquid and the specific density of the liquid forming material. The floating ball is adapted to float between the separating liquid and the liquid forming material, so as to detect the junction between the separating liquid and the liquid forming material through a floating position of the floating ball.

In one embodiment of the invention, the liquid forming material includes a photosensitive resin, and the separating liquid includes saline water.

In one embodiment of the invention, the moving platform is adapted to move in relative to the tank along an axial direction, the axial direction is perpendicular to the junction between the separating liquid and the liquid forming material, and the control unit uses the junction as the initial depth at which the moving platform immerses into the liquid forming material.

In view of the above, the three-dimensional printing apparatus of the invention sinks the separating liquid with the larger specific density between the bottom of the tank and the liquid forming material with the smaller specific density. As such, the separating liquid may separate the liquid forming material from the bottom of the tank, so as to prevent the cured liquid forming material from adhering on the bottom of the tank and further influencing the subsequent forming results. Furthermore, the another three-dimensional printing apparatus of the invention sinks the liquid forming material with the larger specific density between the bottom of the tank and the separating liquid with the smaller specific density. As such, the separating liquid may separate the liquid forming material from air, so as to prevent the liquid forming material from contacting with the air and generating viscosity on the liquid surface and further influencing the subsequent forming results. Therefore, the three-dimensional printing apparatus of the invention has favorable printing quality.

In order to make the aforementioned and other features and advantages of the present application more comprehensible, several embodiments accompanied with figures are described in detail below.

BRIEF DESCRIPTION OF THE DRAWINGS

The accompanying drawings are included to provide a further understanding of the application, and are incorporated in and constitute a part of this specification. The drawings illustrate embodiments of the application and, together with the description, serve to explain the principles of the application.

DETAILED DESCRIPTION OF DISCLOSED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", "left", "right", etc., is used with reference to the orientation of the Figure(s) being described. The components of the present invention can be positioned in a number of different orientations. As such, the directional terminology is used for purposes of illustration and is in no way limiting.

Figure 1:
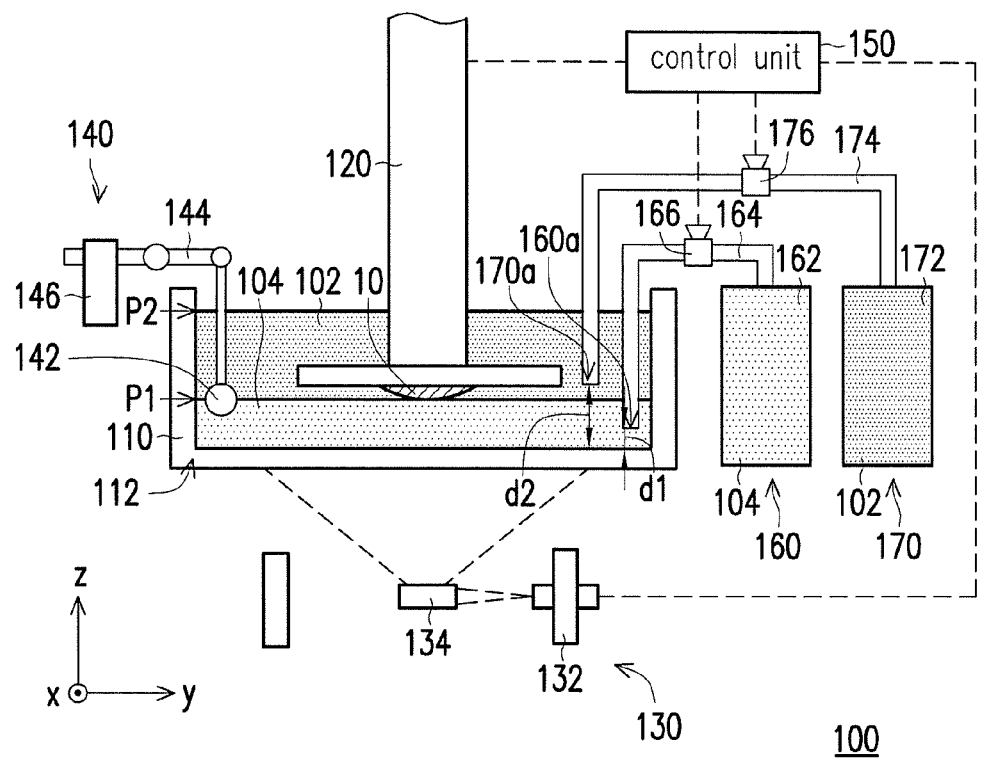
FIG. 1 is a schematic diagram illustrating a three-dimensional printing apparatus according to an embodiment of the invention.
Figure 2:
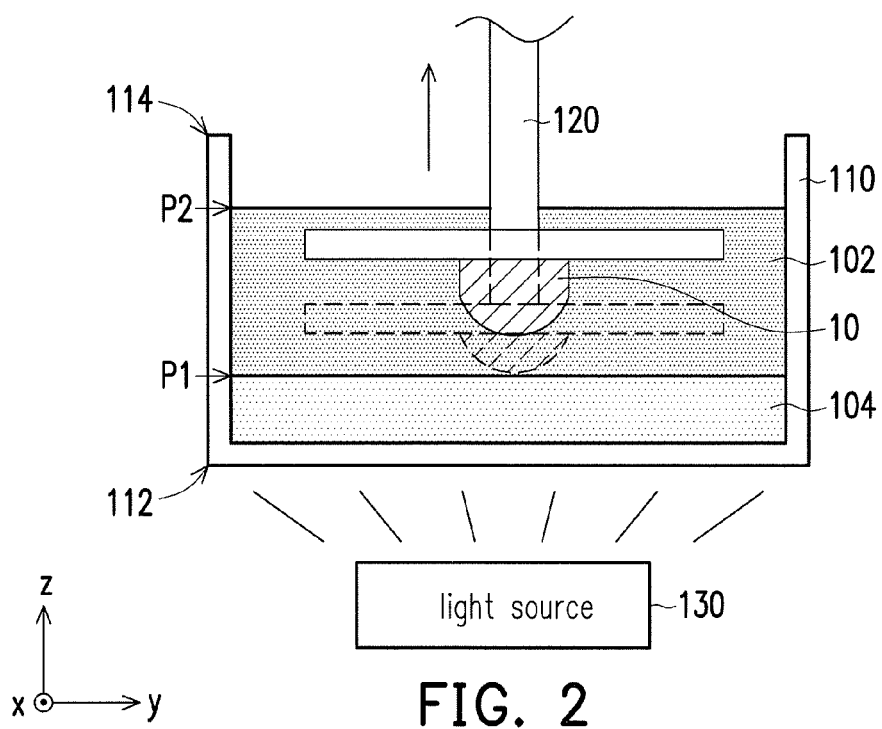
FIG. 2 is a partial enlarged diagram of the three-dimensional printing apparatus in FIG. 1.

FIG. 1 is a schematic diagram illustrating a three-dimensional printing apparatus according to an embodiment of the invention. FIG. 2 is a partial enlarged diagram of the three-dimensional printing apparatus in FIG. 1, wherein the FIG. 2 only illustrates a tank 110, a part of moving platform 120 and a light source 130, so as to provide a better clarity of the drawing. Referring to FIG. 1 and FIG. 2, in the present embodiment, a three-dimensional printing apparatus 100 includes the tank 110, the moving platform 120, the light source 130, a detecting unit 140 and a control unit 150. The tank 110 is filled with a liquid forming material 102 and a separating liquid 104, wherein a specific density of the separating liquid 104 is larger than a specific density of the liquid forming material 102, and the separating liquid 104 and the liquid forming material 102 are immiscible with each other, so that the separating liquid 104 sinks between the bottom 112 of the tank 110 and the liquid forming material 102. In other words, in the present embodiment, the separating liquid 104 must select a material with a specific density larger than that of the liquid forming material 102, such as saline water, so as to sink between the liquid forming material 102, such as a photosensitive resin, and the bottom 112 of the tank 110, and the two are immiscible. However, the invention does not limit the materials of the liquid forming material 102 and the separating liquid 104, such that the materials can be selected under the above-described conditions based on the needs.

Moreover, in the present embodiment, the moving platform 120 is movably disposed above the tank 110 and adapted to immerse into the liquid forming material 102. The light source 130 is disposed below the tank 110 so as to irradiate the liquid forming material 102. The detecting unit 140 is disposed at a side of the tank 110 and adapted to detect a junction between the separating liquid 104 and the liquid forming material 102, namely, a liquid level position P1 of the separating liquid 104. The control unit 150 is coupled to the light source 130, the detecting unit 140 and the moving platform 120 for controlling the light source 130, the detecting unit 140 and the moving platform 120. The three-dimensional printing apparatus 100 is adapted to fabricate a three-dimensional object 10 according to a digital three-dimensional model (not shown), wherein the digital three-dimensional model may, for example, be constructed with a computer-aided design (CAD) or an animation modeling software, and crosscut the digital three-dimensional model into a plurality of cross-sections. The three-dimensional printing apparatus 100 accesses the digital three-dimensional model and fabricates the three-dimensional object 10 according to the cross-sections of the digital three-dimensional model, and thus three-dimensional object 10 is obtained by using the light source 130 to irradiate and cure the liquid forming material 102.

Specifically, in the present embodiment, the moving platform 120 is positioned above the tank 110 and adapted to move in relative tot the tank 110 along an axial direction, and this axial direction may, for example, be perpendicular to the junction between the separating liquid 104 and the liquid forming material 102 (the liquid level position P1 of the separating liquid 104). For instance, in FIG. 1, the moving platform 120 is adapted to move along a Z-axis, so as to move in relative to the tank 110 located on a XY-plane and thereby immerse into the liquid forming material 102 filled within the tank 110. In the present embodiment, the moving platform 120 has a bearing surface for bearing the three-dimensional object 10, and the bearing surface faces toward the light source 130. The light source 130 is fixed below the tank 110, and the light source 130 includes a laser device 132 and an oscillating mirror module 134. The laser device 132 is adapted to emit laser light, and the oscillating mirror module 134 is adapted to project the laser light to the liquid forming material 102. However, the invention does not limit the type of the light source 130. Since the liquid forming material 102, for example, is a photosensitive resin or other suitable light-curing materials, the liquid forming material 102 is cured after being irradiated by the light source 130. As such, the control unit 150 uses the junction detected by the detecting unit 140 as an initial depth at which the moving platform 120 immerses into the liquid forming material 102. The control unit 150 controls the initial depth at which the bearing surface of the moving platform 120 immerses into the liquid forming material 102 according to the junction detected by the detecting unit 140, controls the moving platform 120 to move from the initial depth in the liquid forming material 102 layer by layer towards a direction away from the light source 130, and controls the light source 130 to irradiate the liquid forming material 102, so as to cure the irradiated liquid forming material 102 layer by layer, thereby forming the three-dimensional object 10 on the bearing surface of the moving platform 120.

Furthermore, during the operation process of the three-dimensional printing apparatus 100 of the present embodiment, the moving platform 120 is firstly moved to an initial depth of the liquid forming material 102, and this initial depth is substantially at the junction between the liquid forming material 102 and the separating liquid 104. During the process of the light source 130 irradiating the liquid forming material 102, the moving platform 120 moves from the initial depth in the liquid forming material 102 layer by layer towards the direction away from the light source 130 and gradually approaches the top 114 of the tank 110, as indicated by an arrow in FIG. 2. Whenever the moving platform 120 moves to a position on the Z-axis, the light source 130 irradiates a portion of the liquid forming material 102 located thereby, so as to cure the portion of the liquid forming material 102. Hence, as the moving platform 120 moves along the Z-axis layer by layer, the liquid forming material 102 located at a path being passed by the moving platform 120 may be layer by layer cured on the moving platform 120, thereby eventually forming the three-dimensional object 10. Now, since the detecting unit 140 may detect the junction between the separating liquid 104 and the liquid forming material 102 (namely, the liquid level position P1 of the separating liquid 104), the control unit 150 may control the moving platform 120 according to the junction detected by the detecting unit 140, so as prevent the three-dimensional object 10 on the moving platform 120 from immersing into the separating liquid 104 or contacting the bottom 112 of the tank 110.

In other words, under the condition of being configured without the separating liquid 104, the control unit 150 uses the bottom surface of the liquid forming material 102 (namely, the bottom 112 of the tank 110) as the initial depth, and the moving platform 120 moves from the bottom 112 of the tank 110 in the liquid forming material 102 layer by layer towards the direction away from the light source 130. Thus, under the condition of being configured without the separating liquid 104, the three-dimensional object 10 formed by using the light source 130 to irradiate the bottom surface of the liquid forming material 102 is prone to contact with the bottom 112 of the tank 110, thereby causing a problem of adhesion. Therefore, in the present embodiment, the separating liquid 104 is disposed between the liquid forming material 102 and the bottom 112 of the tank 110, so that the separating liquid 104 may separate the liquid forming material 102 from the bottom 112 of the tank 110 during the formation of the three-dimensional object 10, and thereby prevent the cured liquid forming material 102 from adhering on the bottom 112 of the tank 110 and further influencing the subsequent forming results, such as being deposited on the bottom 112 and thus influences the light source 130 that irritates the liquid forming material 102, or causing excess liquid forming material 102 to cure on the three-dimensional object 10 and thus results in printing errors.

On the other hand, in the present embodiment, the detecting unit 140 includes a floating ball 142, a linkage module 144 and a detection device 146. The floating ball 142 is disposed within the tank 110, and a specific density of the floating ball 142 ranges between the specific density of the separating liquid 104 and the specific density of the liquid forming material 102. Accordingly, after the tank 110 is filled with the separating liquid 104 and the liquid forming material 102, the floating ball 142 may float between the separating liquid 104 and the liquid forming material 102, so as to detect the junction between the separating liquid 104 and the liquid forming material 102 (the liquid level position P1 of the separating liquid 104) through the position of the floating ball 142. At this time, the floating ball 142 is connected with the detection device 146 through the linkage module 144, rises or drops according to the capacity of the separating liquid 104 increases or decreases, and is linked to the detection device 146 in motion through the linkage module 144. As such, the detecting unit 140 may detect the liquid level position P1 of the separating liquid 104 through the position of the floating ball 142. After the detecting unit 140 detects the liquid level position P1 of the separating liquid 104, the control unit 150 may control a starting position of the moving platform 120, namely, the initial depth at which the moving platform 120 immerses into the liquid forming material 102, according to a detection result of the detecting unit 140. In other words, the control unit 150 may control the moving platform 120 to use the junction between the separating liquid 104 and the liquid forming material 102 as the starting position and to gradually move upward along the Z-axis, so that the liquid forming material 102 is layer by layer cured on the moving platform 120. Accordingly, during the process of forming the three-dimensional object 10, the separating liquid 104 may separate the three-dimensional object 10 from the bottom 112 of the tank 110, and the control unit 150 may control the moving platform 120 according to the junction between the separating liquid 104 and the liquid forming material 102 (liquid level position P1) being detected, so as to prevent the three-dimensional object 10 on the moving platform 120 from contacting the bottom 112 of the tank 110. As such, the already formed three-dimensional object 10 would not be damaged due to contacting the bottom 112 of the tank 110, and the cured liquid forming material 102 also would not influence the irradiation pathway of the light source 130 or adhere on the three-dimensional object 10 due to adhering on the bottom 112 of the tank 110 and further influencing the subsequent forming results. Therefore, the three-dimensional printing apparatus 100 of the present embodiment has favorable printing quality.

Referring to FIG. 1 again, in the present embodiment, the three-dimensional printing apparatus 100 further includes a first injection module 160 and a second injection module 170. The first injection module 160 is connected to the tank 110, so as to inject a certain amount of the separating liquid 104 into the tank 110. The second injection module 170 is connected to the tank 110, so as to inject a certain amount of the liquid forming material 102 into the tank 110. In other words, when the tank 110 is not yet filled with the liquid forming material 102 and the separating liquid 104, the certain amount of the separating liquid 104 may be injected into the tank 110 via the first injection module 160. Since the amount of the separating liquid 104 injected into the tank 110 is quantified, the liquid level position P1 of the separating liquid 104 may be obtained even without using the detecting unit 140 to perform calculation, and then junction between the separating liquid 104 and liquid forming material 102 may thus be obtained. After the tank 110 is filled with the separating liquid 104, the certain amount of the liquid forming material 102 may be injected into the tank 110 via the second injection module 170. Since the amount of the liquid forming material 102 injected into the tank 110 is quantified, a liquid level position P2 of the liquid forming material 102 may be obtained through calculation.

Afterward, when the three-dimensional object 10 is formed by the three-dimensional printing apparatus 100 via the above-described steps, since the liquid forming material 102 is layer by layer cured on moving platform 120 via the irradiation of the light source 130, the liquid forming material 102 filled within the tank 110 would gradually decrease. Therefore, when the liquid level position P2 of the liquid forming material 102 is lower than a preset value, the control unit 150 controls the second injection module 170 to inject a proper amount of the liquid forming material 102 into the tank 110. Similarly, even though the separating liquid 104 would not be cured during the process of forming the three-dimensional object 10, but the separating liquid 104 may also be decreased through volatilization. Hence, when the liquid level position P1 of the separating liquid 104 is lower than a preset value, the control unit 150 may also control the first injection module 160 to inject a proper amount of the separating liquid 104 into the tank 110. Accordingly, the three-dimensional printing apparatus 100 of the present embodi-ment may timely supplement the separating liquid 104 and the liquid forming material 102 during the process of forming the three-dimensional object 10 via the first injection module 160 and the second injection module 170. Furthermore, since the detecting unit 140 (e.g., the floating ball 142) of the present embodiment may detect the junction between the separating liquid 104 and the liquid forming material 102 (liquid level position P1), when the detecting unit 140 detects the liquid level position P1 of the separating liquid 104 is lower than the preset value, the control unit 150 may control the first injection module 160 to automatically inject the separating liquid 104 into the tank 110 according to the detection result of the detecting unit 140. For instance, when the position of the floating ball 142 drops to a preset value, it may indicate that the liquid level position P1 of the separating liquid 104 is lower than the preset value. At this time, the floating ball 142 drives the linkage module 144 to cut off the switch of the detection device 146, so that the detection device 146 transmits a signal to the control unit 150. Therefore, the control unit 150 may control the first injection module 160 to automatically inject the separating liquid 104 according to the signal. As such, features of the junction may be detected by the detection module 140, so that the control unit 150 may control the first injection module 160 to automatically inject the separating liquid 104, thereby making the supplement of the separating liquid 104 to be more convenient.

On the other hand, in the present embodiment, the first injection module 160 has a first injection opening 160a, and the second injection module 170 has a second injection opening 170a. The first injection opening 160a and the second injection opening 170a are respectively connected with the tank 110. Thus, the first injection module 160 may inject the separating liquid 104 into the tank 110 via the first injection opening 160a, and the second injection module 170 may inject the liquid forming material 102 into the tank 110 via the second injection opening 170a. Noteworthy, even though the separating liquid 104 and the liquid forming material 102 are immiscible with each other, but in order to quickly separate the separating liquid 104 from the liquid forming material 102, in addition to injection the separating liquid 104 and the liquid forming material 102 into the empty tank 110 in sequence, the position of the first injection opening 160a may further be designed as being lower than the position of the second injection opening 170a; namely, a relative distance d1 from the first injection opening 160a to the bottom 112 of the tank 110 is smaller than a relative distance d2 from the second injection opening 170a to the bottom 112 of the tank 110. As such, when the three-dimensional printing apparatus 100 has to be supplemented with the separating liquid 104 and the liquid forming material 102, the separating liquid 104 is injected into the tank 110 from a lower position of the tank 110, and the liquid forming material 102 is injected into the tank 110 from a higher position of the tank 110, wherein the separating liquid 104 and the liquid forming material 102 may be injected into the tank 110 at different heights and may be quickly separated.

Further, in the present embodiment, the first injection module 160 includes a first storage tank 162, a first pipeline 164 and a first valve 166. The first storage tank 162 is configured to store the separating liquid 104, the first pipeline 164 is connected to the first storage tank 162 and extends into the tank 110, and an end of the first pipeline 164 constitutes the first injection opening 160a, so as to inject the separating liquid 104 within the first storage tank 162 into the tank 110. In addition, the first valve 166 is disposed on the first pipeline 164, and the control unit 150 may control whether the separating liquid 104 is to be injected into the tank 110 via the first valve 166 according to user needs or according to the detection result of the detecting unit 140. Similarly, the second injection module 170 includes a second storage tank 172, a second pipeline 174 and a second valve 176. The second storage tank 172 is configured to store the liquid forming material 102, the second pipeline 174 is connected to the second storage tank 172 and extends into the tank 110, and an end of the second pipeline 174 constitutes the second injection opening 170a, so as to inject the liquid forming material 102 within the second storage tank 172 into the tank 110. In addition, the second valve 176 is disposed on the second pipeline 174, and the control unit 150 may control whether the liquid forming material 102 is to be injected into the tank 110 via the second valve 176 according to user needs. However, the descriptions provided above are merely one of the implementations of the first injection module 160 and the second injection module 170; in other embodiments (not shown), the first pipeline and the second pipeline may also directly penetrate sidewalls of the tank 110 and connect with the tank 110, but the invention does not limit the implementation of the injection modules and also does not limit whether the injection modules are to be configured thereto.

Figure 3:
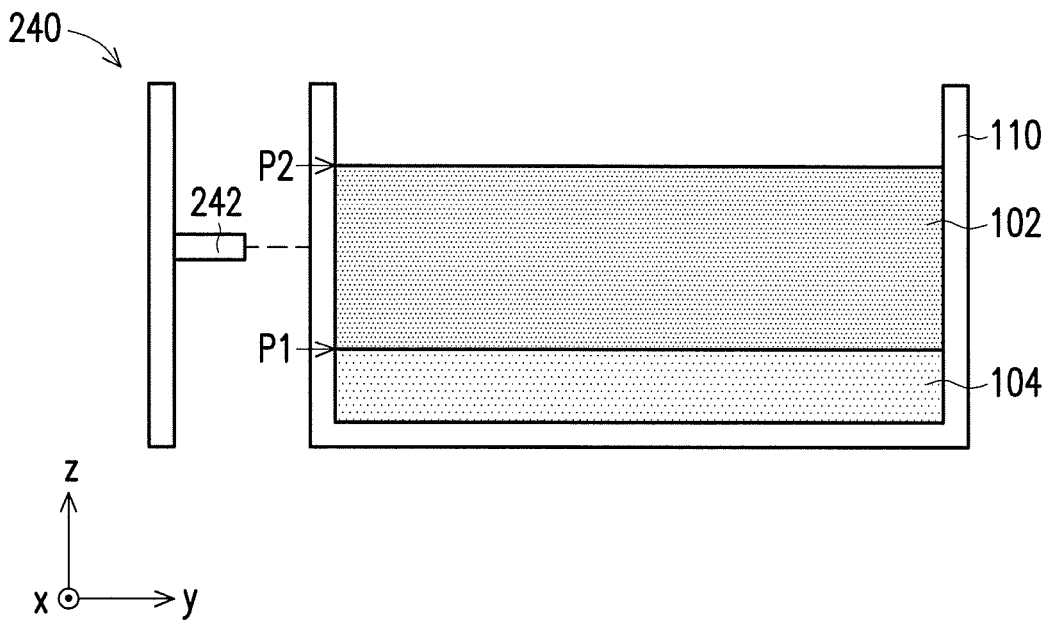
FIG. 3 is a partial schematic diagram illustrating a three-dimensional printing apparatus according to another embodiment of the invention.

FIG. 3 is a partial schematic diagram illustrating a three-dimensional printing apparatus according to another embodiment of the invention, wherein FIG. 3 only illustrates the tank 110 and a detecting unit 240 for the clarity of the drawing. Referring to FIG. 1 and FIG. 3, in the present embodiment, the detecting unit 240 is adapted to the three-dimensional printing apparatus 100. The implementation of the detecting unit 240 is different from that of the detecting unit 140. The detecting unit 240 of the present embodiment, in addition to detecting the junction between the separating liquid 104 and the liquid forming material 102 (liquid level position P1 of the separating liquid 104), may also detect the liquid level position P2 of the liquid forming material 102. Specifically, in the present embodiment, the detecting unit 240 includes an optical element 242 disposed at the side of the tank 110. The optical element 242 is adapted to move along an axial direction, such as Z-axis, and emits lights (e.g., dashed lines shown in FIG. 2) toward the separating liquid 104 and the liquid forming material 102. Since the tank 110 is disposed on the XY-plane, the liquid surfaces of the separating liquid 104 and the liquid forming material 102 may be considered as parallel to the XY-plane, and the lights emitted by the optical element 242 may also be considered as parallel to the XY-plane. As such, an axial moving direction (Z-axis) of the optical element 242 is perpendicular to the liquid surfaces of the separating liquid 104 and the liquid forming material 102 and the junction therebetween (parallel to the XY-plane), and the lights are parallel to the liquid surfaces of the separating liquid 104 and the liquid forming material 102 and the junction therebetween (all parallel to the XY-plane). Since reflection results of the lights in the separating liquid 104, the liquid forming material 102 and the air are different, by moving the optical element 240 along the Z-axis and emitting the lights toward the separating liquid 104 and the liquid forming material 102, so as to detect the liquid level position P1 of the separating liquid 104 and the liquid level position P2 of the liquid forming material 102 through the reflections of the light, thereby obtaining the junction therebetween. As such, the control unit 150 (shown in FIG. 1) may control the initial depth at which the moving platform 120 immerses into the liquid forming material 102 according to the junction detected by the detecting unit 240, so as to prevent the three-dimensional object 10 on the moving platform 120 from contacting the bottom 112 of the tank 110.

Furthermore, since the detecting unit 240 of the present embodiment may detect the liquid level position P1 of the separating liquid 104 and the liquid level position P2 of the liquid forming material 102, when the detecting unit 240 detects that the liquid level position P1 of the separating liquid 104 is lower than the preset value, the control unit 150 may control the first injection module 160 to automatically inject the separating liquid 104 into the tank 110 according to the detection result of the detecting unit 240, and when the detecting unit 240 detects that the liquid level position P2 of the liquid forming material 102 is lower than the preset value, the control unit 150 may control the second injection module 170 to automatically inject the liquid forming material 102 into the tank 110 according to the detection result of the detecting unit 240. As such, during the process of forming the three-dimensional object 10, the first injection module 160 and the second injection module 170 of the present embodiment may automatically supplement the separating liquid 104 and the liquid forming material 102 via the detecting unit 240 and the control unit 150.

Figure 4:
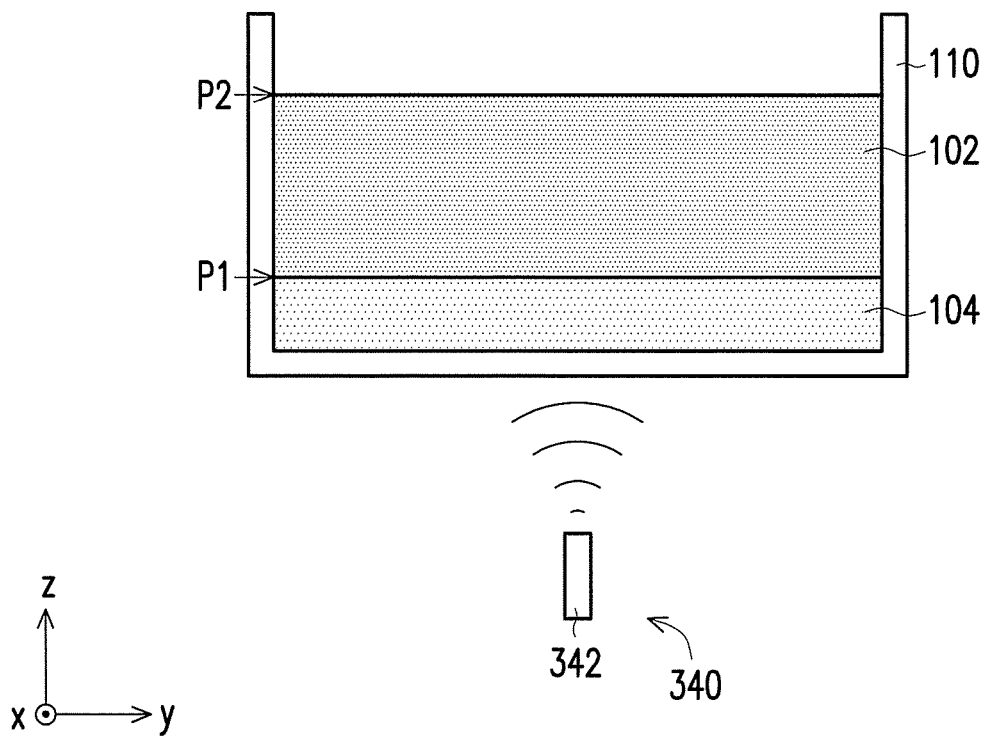
FIG. 4 is a partial schematic diagram illustrating a three-dimensional printing apparatus according to yet another embodiment of the invention.

FIG. 4 is a partial schematic diagram illustrating a three-dimensional printing apparatus according to yet another embodiment of the invention, wherein FIG. 4 only illustrates the tank 110 and a detecting unit 340 for the clarity of the drawing. Referring to FIG. 1 and FIG. 4, in the present embodiment, the detecting unit 340 is also adapted to the three-dimensional printing apparatus 100. The implementation of the detecting unit 340 is different from that of the detecting unit 140. The detecting unit 340 of the present embodiment, in addition to detecting the junction between the separating liquid 104 and the liquid forming material 102 (the liquid level position P1 of the separating liquid 104), may also detect the liquid level position P2 of the liquid forming material 102. Specifically, in the present embodiment, the detecting unit 340 includes an ultrasonic element 342 disposed below the tank 110. The ultrasonic element 342 is adapted to emit ultrasonic waves toward the separating liquid 104 and the liquid forming material 102 along an axial direction (e.g., Z-axis). Since the ultrasonic element 342 is located below the tank 110 and the axial direction (Z-axis) of the ultrasonic waves emitted by the ultrasonic element 342 is perpendicular to the liquid surfaces of the separating liquid 104 and the liquid forming material 102 and the junction therebetween (parallel to the XY-plane), the ultrasonic waves emitted by the ultrasonic element 342 would pass through the bottom 112 of the tank 110, the separating liquid 104, the liquid forming material 102 and the air, sequentially, and generate reflections at junctions between each of the above-mentioned components. Since reflection results of the ultrasonic waves in the bottom 112 of the tank 110, the separating liquid 104, the liquid forming material 102 and the air are different, by emitting the ultrasonic waves toward the separating liquid 104 and the liquid forming material 102 along the Z-axis, the liquid level position P1 of the separating liquid 104, the liquid level position P2 of the liquid forming material 102, and the junction therebetween may be detected through the reflections of the ultrasonic waves. As such, the control unit 150 (shown in FIG. 1) may control the initial depth at which the moving platform 120 immerses into the liquid forming material 10 according to the junction detected by the detecting unit 340, so as to prevent the three-dimensional object 10 on the moving platform 120 from contacting the bottom 112 of the tank 110.

Similar to the detecting unit 240, since the detecting unit 340 of the present embodiment may detect the liquid level position P1 of the separating liquid 104 and the liquid level position P2 of the liquid forming material 102, when the detecting unit 340 detects that the liquid level position P1 of the separating liquid 104 is lower than the preset value, the control unit 150 may control the first injection module 160 to automatically inject the separating liquid 104 into the tank 110 according to the detection result of the detecting unit 340, and when the detecting unit 340 detects that the liquid level position P2 of the liquid forming material 102 is lower than the preset value, the control unit 150 may control the second injection module 170 to automatically inject the liquid forming material 102 into the tank 110 according to the detection result of the detecting unit 340. Hence, during the process of forming the three-dimensional object 10, the first injection module 160 and the second injection module 170 of the present embodiment may automatically supplement the separating liquid 104 and the liquid forming material 102 via the detecting unit 340 and the control unit 150.

Figure 5:
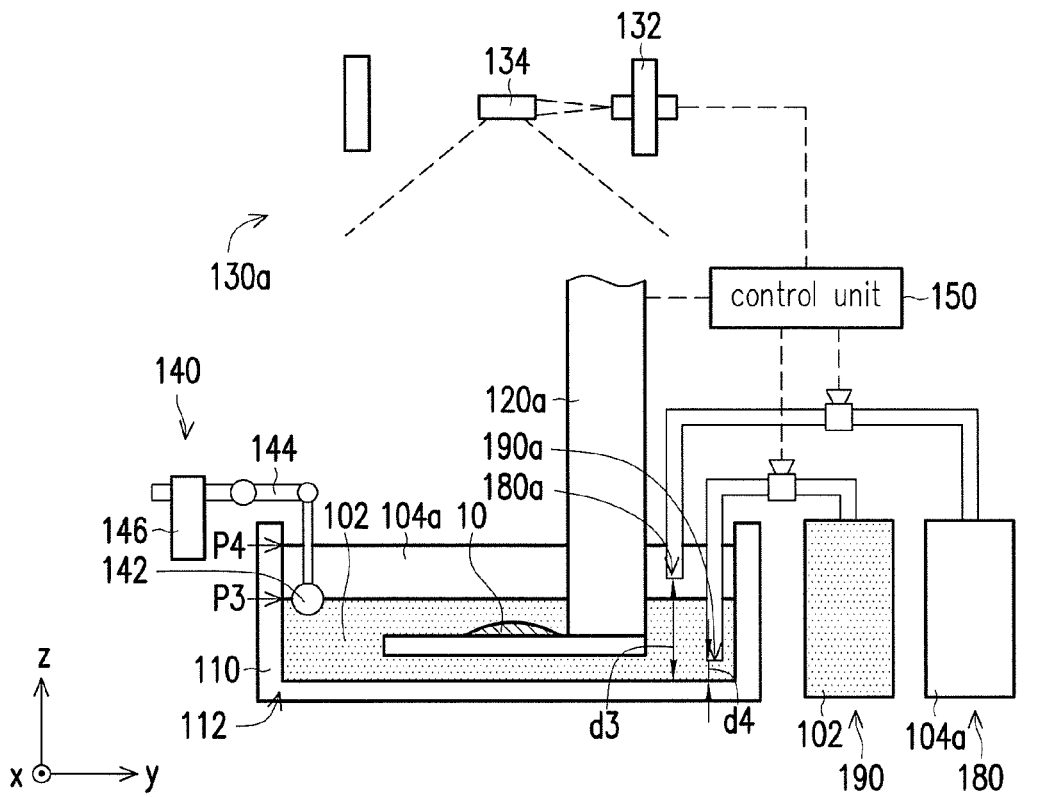
FIG. 5 is a schematic diagram illustrating a three-dimensional printing apparatus according to another embodiment of the invention.
Figure 6:
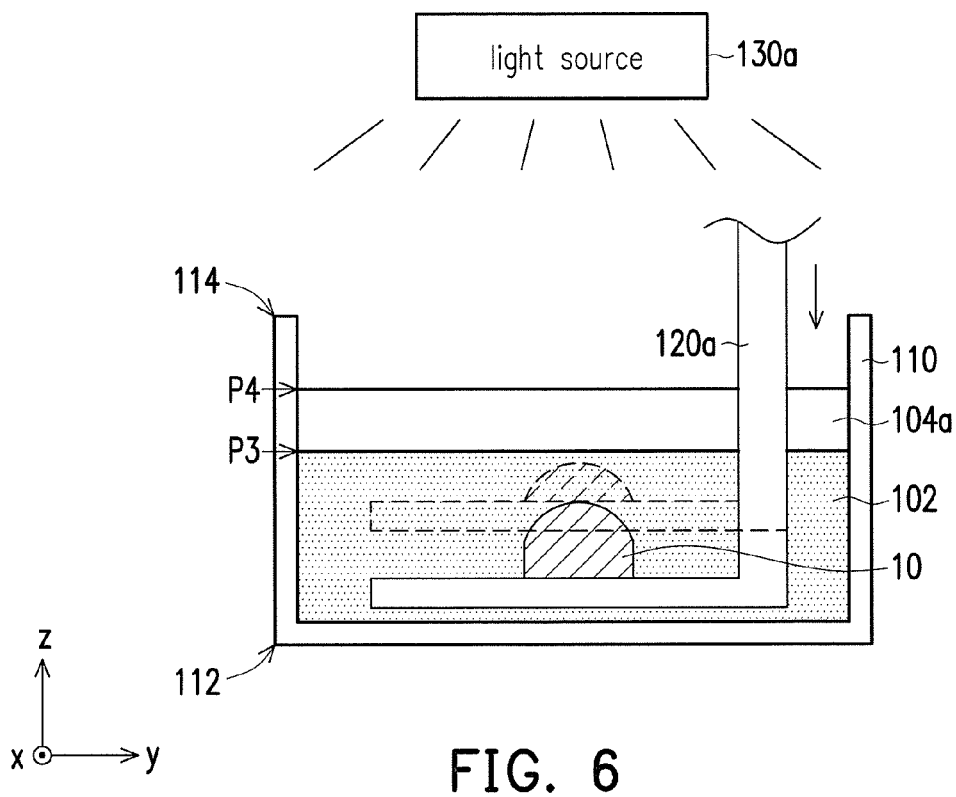
FIG. 6 is a partial enlarged diagram of the three-dimensional printing apparatus in FIG. 5.

FIG. 5 is a schematic diagram illustrating a three-dimensional printing apparatus according to another embodiment of the invention. FIG. 6 is a partial enlarged diagram of the three-dimensional printing apparatus in FIG. 5, wherein FIG. 6 only illustrates the tank 110, a portion of the moving platform 120a and the light source 130a for the clarity of the drawing. Referring to FIG. 5 and FIG. 6, in the present embodiment, a three-dimensional printing apparatus 100a includes the tank 110, a moving platform 120a, a light source 130a, the detecting unit 140 and the control unit 150. A difference between the three-dimensional printing apparatus 100a and the three-dimensional printing apparatus 100 lies in the liquid forming material 102 and the separating liquid 104a filled within the tank 110, wherein a specific density of the liquid forming material 102 is greater than a specific density of the separating liquid 104a, and the separating liquid 104a and the liquid forming material 102 are immiscible with each other, so that the liquid forming material 102 sinks between the bottom 112 of the tank 110 and the separating liquid 104a. In other words, in the present embodiment, the separating liquid 104a is different from the separating liquid 104, in which that the separating liquid 104a must be selected from a material with a specific density smaller than that of the liquid forming material 102, such as water, so as to float on the liquid forming material 102, such as a photosensitive resin, and to cover the liquid forming material 102. However, the invention does not limit the materials of the liquid forming material 102 and the separating liquid 104a, such that the materials can be selected under the above-described conditions based on the needs.

In addition, in the present embodiment, the moving platform 120a is movably disposed above the tank 110 and adapted to be immersed into the liquid forming material 102. The light source 130a is disposed above the tank 110 so as to irradiate the liquid forming material 102, while a moving path of the moving platform 120a also disposed above the tank 110 does not interfere with the light source 130a that irradiates the liquid forming material 102. The detecting unit 140 is disposed at a side of the tank 110 and adapted to detect a junction between the separating liquid 104a and the liquid forming material 102, namely, a liquid level position P3 of the liquid forming material 102. The control unit 150 is coupled to the light source 130a, the detecting unit 140 and the moving platform 120a for controlling the light source 130a, the detecting unit 140 and the moving platform 120a. As previously described, the moving platform 120a is positioned above the tank 110 and adapted to move in relative to the tank 110 along an axial direction (e.g., Z-axis), and this axial direction is perpendicular to the junction between the separating liquid 104a and the liquid forming material 102 (the liquid level position P3 of the liquid forming material 102).

As such, the control unit 150 may control an initial depth at which the bearing surface of the moving platform 120a immerses into the liquid forming material 102 according to the junction detected by the detecting unit 140, control the moving platform 120a to move from the initial depth in the liquid forming material 102 towards the direction away from the light source 130 layer by layer, and also concurrently control the light source 130a to irradiate the liquid forming material 102, so as to cure the irradiated liquid forming material 102 layer by layer, thereby forming the three-dimensional object 10 on the moving platform 120a. In addition to the material characteristics and the location of the separating liquid 104a, another difference between the present embodiment and the previous embodiment lies in that: during the process of using the light source 130a to irradiate the liquid forming material 102, since the light source 130a is located below the tank 110, the moving platform 120a moves in the liquid forming material 102 toward the direction away from the light source 130a and gradually approaches the bottom 112 of the tank 110, as indicated by the allow shown in FIG. 6. As such, as the moving platform 120a moves along the Z-axis layer by layer, the liquid forming material 102 located at a path being passed by the moving platform 120a may be layer by layer cured on the moving platform 120a, thereby eventually forming the three-dimensional object 10. At this time, since the detecting unit 140 may detect the junction between the separating liquid 104 and the liquid forming material 102 (namely, the liquid level position P3 of the liquid forming material 102), the control unit 150 may control the moving platform 120a according to the junction detected by the detecting unit 140, so as prevent the three-dimensional object 10 on the moving platform 120a from contacting with the air during the process of formation.

Further mentioning, during the process of forming the three-dimensional object 10, the separating liquid 104a may separate the liquid forming material 102 from the air, so as to prevent an "oxygen inhibition phenomenon" from being generated between the liquid forming material 102 and the air. The said "oxygen inhibition phenomenon" is referred to a viscous phenomenon generated by the liquid forming material 102 after the photosensitive resin, viz. the liquid forming material 102, is in contact with the oxygen in the air, and thus is detriment to the curing by the irradiation of the light source 130a. As such, under the condition of being configured without the separating liquid 104a, when the control unit 150 uses the liquid surface of the liquid forming material 102 as the initial depth for controlling the moving platform 102 to immerse into the liquid forming material 102 and to move from the liquid surface of the liquid forming material 102 towards the direction away from the light source 130a to start the formation layer by layer, the viscous phenomenon generated after the liquid surface of the liquid forming material 102 is in contact with the oxygen in the air is detriment to the curing of the liquid forming material 102, thereby further influencing the surface hardness of the three-dimensional object 10. Moreover, if the three-dimensional object 10 moves out of the liquid forming material 102 and comes in contact with the air during the process of formation, residues of the liquid forming material 102 on the surface of the three-dimensional object 10 would generate viscosity on the three-dimensional object 10, such that it is detriment to the subsequent curing of the liquid forming material 102. Accordingly, the tank 110 of the present embodiment is filled with the separating liquid 104a which has a smaller specific density and is immiscible, so as to separate the liquid forming material 102 from the air, thereby improving the above-mentioned oxygen inhibition phenomenon. As such, the separating liquid 104a may prevent the liquid forming material 102 from contacting with the air. When the control unit 150 uses the junction between the liquid forming material 102 and the separating liquid 104a (liquid level position P3) as the initial depth, the liquid forming material 102 used for forming does not contact with the air and may smoothly be layer by layer cured on the moving platform 120a via the irradiation of the light source 130a, and thus the formed three-dimensional object 10 has favorable surface hardness. Therefore, the three-dimensional printing apparatus 100 of the present embodiment has favorable printing quality. In addition, the photosensitive resin used as the liquid forming material 102 has a strong odor; and therefore, the separating liquid 104a is disposed on the liquid forming material 102 to prevent the odor of the liquid forming material 102 from dissipating out of the tank 110.

On the other hand, in the present embodiment, the composition and the implementation of the detecting unit 140 may be referred to back the above descriptions. The detecting unit 140 may be configured to detect the junction between the separating liquid 104a and the liquid forming material 102 (the liquid level position P3 of the liquid forming material 102). Moreover, the detecting unit 140 in the three-dimensional printing apparatus 100a may also be switched to the detecting units 240 and 340 shown in FIG. 3 and FIG. 4 according to the needs. The compositions and the implementations of the detecting units 240 and 340 may also be referred back to the above descriptions. The detecting units 240 and 340, in addition to detecting the liquid level position P3 of the liquid forming material 102 (the junction between the separating liquid 104a and the liquid forming material 102), may also detect a liquid level position P4 of the separating liquid 104a (the junction between the separating liquid 104a and the air). As such, by using the detecting units 240 and 340 to detect the junction between the separating liquid 104a and the liquid forming material 102 (liquid level position P3), the control unit 150 may control the initial depth at which the moving platform 120a immerses into the liquid forming material 102, and by using the detecting units 240 and 340 to further detect the liquid level position P4 of the separating liquid 104a, the control unit 150 may control the moving platform 120a to prevent the moving platform 120a from moving out of the liquid forming material 102 and contacting with the air.

Similarity, in the present embodiment, the three-dimensional printing apparatus 100a may also include a first injection module 180 and a second injection module 190, which are similar to the ones mentioned above. The first injection module 180 is connected to the tank 110, so as to inject a certain amount of the separating liquid 104a into the tank 110. The second injection module 190 is connected to the tank 110, so as to inject a certain amount of the liquid forming material 102 into the tank 110. When the tank 110 is not yet filled with the liquid forming material 102 and the separating liquid 104a, the certain amount of the liquid forming material 102 and the certain amount of the separating liquid 104a may sequentially be injected into the tank 110 via the second injection module 190 and the first injection module 180, respectively. During the subsequent supplements, such as when the liquid level position P4 of the separating liquid 104a and the liquid level position P3 of the liquid forming material 102 are lower than a preset value, the control unit 150 controls the second injection module 190 and the first injection module 180 to inject proper amounts of the liquid forming material 102 and the separating liquid 104a into the tank 110. Accordingly, the three-dimensional printing apparatus 100a of the present embodiment may also timely supplement the separating liquid 104a and the liquid forming material 102 via the first injection module 180 and the second injection module 190 during the process of forming the three-dimensional object 10. The compositions and the injection means of the first injection module 180 and the second injection module 190 may be referred to the descriptions regarding the first injection module 160 and the second injection module 170, and thus no further elaboration is provided herein. A difference between the first injection module 180 and the second injection module 190 of the present embodiment and the first injection module 160 and the second injection module 170 of the previous embodiment lies in that the relative positions of a first injection opening 180a of the first injection module 180 and a second injection opening 190a of the second injection module 190 of the present embodiment are different from the previously embodiment. In the present embodiment, in order to quickly separate the separating liquid 104a from the liquid forming material 102, in addition to injecting the liquid forming material 102 and the separating liquid 104a into the tank 110 sequentially, the position of the first injection opening 180a may be designed as being higher than the position of the second injection opening 190a; namely, a relative distance d3 from the first injection opening 180a to the bottom 112 of the tank 110 is greater than a relative distance d4 from the second injection opening 190a to the bottom 112 of the tank 110. As such, when the three-dimensional printing apparatus 100a has to be supplemented with the separating liquid 104a and the liquid forming material 102, the separating liquid 104a is injected into the tank 110 from a higher position of the tank 110, while the liquid forming material 102 is injected into the tank 110 from a lower position of the tank 110, such that the separating liquid 104a and the liquid forming material 102 may be injected into the thank 110 at different heights and may be quickly separated.

Furthermore, as previously described, the detecting unit 140 in the three-dimensional printing apparatus 100a of the present embodiment may be switched to the detecting units 240 and 340 shown in FIG. 3 and FIG. 4 according to the needs. At this time, since the detecting units 240 and 340 not only can detect the junction between the liquid forming material 102 and the separating liquid 104a (the liquid level position P3 of the liquid forming material 102) but also can detect the liquid level position P4 of the separating liquid 104a. As such, the control unit 150 may control the first injection module 180 and the second injection module 190 to automatically inject the separating liquid 104a and the liquid forming material 102 into the tank 110 according to the detection results (liquid level positions P3 and P4) of the detecting units 240 and the 340. Accordingly, by using the control unit 150 and the detecting unit 240 or 340, the first injection module 180 and the second injection module 190 may automatically supplement the separating liquid 104a and the liquid forming material 102 during the process of forming the three-dimensional object 10.

Figure 7:
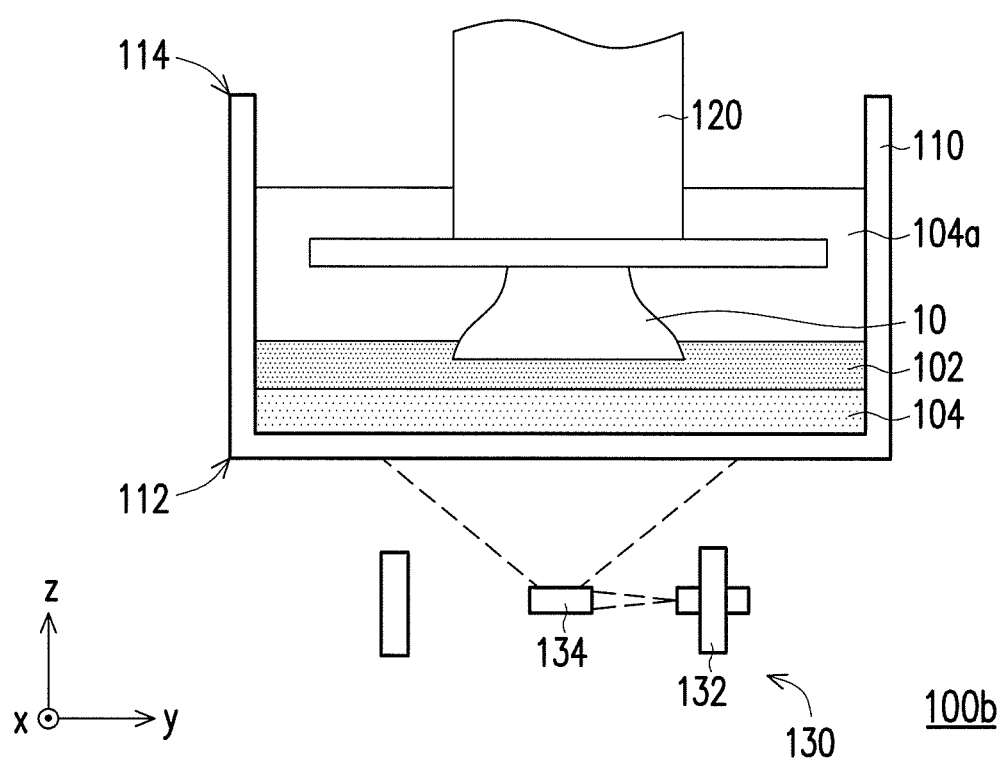
FIG. 7 is a partial schematic diagram illustrating a three-dimensional printing apparatus according to still another embodiment of the invention.

FIG. 7 is a partial schematic diagram illustrating a three-dimensional printing apparatus according to still another embodiment of the invention, wherein FIG. 7 only illustrates the tank 110, a portion of the moving platform 120 and the light source 130 for the clarify of the drawing. Referring to FIG. 1, FIG. 5 and FIG. 7, in the present embodiment, a three-dimensional printing apparatus 100b is much similar to the three-dimensional printing apparatus 100 shown in FIG. 1 and FIG. 2, and a main different therebetween lies in that the tank 110 of the three-dimensional printing apparatus 100b shown in FIG. 7, in addition to be filled with the liquid forming material 102 and the separating liquid 104, can also be filled with the separating liquid 104a illustrated in FIG. 5 and FIG. 6. The characteristics and the relative positions of the liquid forming material 102 and the separating liquids 104 and 104a may be referred back to the above descriptions. The specific density of the separating liquid 104 is larger than the specific density of the liquid forming material 102, and the separating liquid 104 and the liquid forming material 102 are immiscible. The specific density of the liquid forming material 102 is larger than the specific density of the separating liquid 104a, and the separating liquid 104a and the liquid forming material 102 are immiscible with each other. As such, viewing along a direction from the bottom 112 to the top 114 of the tank 110, the contents in the tank 110 are sequentially the separating liquid 104, the liquid forming material 102 and the separating liquid 104a.

In simple terms, the three-dimensional printing apparatus 100b of the present embodiment may be considered as equivalent to the three-dimensional printing apparatus 100 shown in FIG. 1 and FIG. 2 in addition with the separating liquid 104a for separating the liquid forming material 102 from the air, so that the generation of the "oxygen inhibition phenomenon" may be prevented as the liquid forming material 102 comes in contact with the air, thereby enabling the formed three-dimensional object 10 to have favorable surface hardness. Knowingly, the three-dimensional printing apparatus 100b of the present embodiment may include the features of the three-dimensional printing apparatuses 100 and 100a at the same time, which may prevent the cured liquid forming material 102 from adhering on the bottom 112 of the tank 110 through using the separating liquid 104 and further prevent influencing the subsequent forming steps, and may also prevent the viscous phenomenon from being generated on the liquid surface of the liquid forming material 102 through using the separating liquid 104a and prevent reducing the surface hardness of the formed three-dimensional object. Therefore, the three-dimensional printing apparatus 100b has favorable printing quality. Moreover, the photosensitive resin used as the liquid forming material 102 has a strong odor; and therefore, the separating liquid 104a is disposed on the liquid forming material 102 to prevent the odor of the liquid forming material 102 from dissipating out of the tank 110. Furthermore, the three-dimensional printing apparatus 100b may also be correspondingly disposed with three sets of injection module for injection the liquid forming material 102 and the separating liquids 104 and 104a into the tank 110, so as to timely supplement the liquid forming material 102 and the separating liquids 104 and 104a. The compositions and the operating methods of the injection modules may be referred back to the above descriptions, and thus not further elaboration is provided herein.

In summary, the three-dimensional printing apparatus of the invention uses the tank to contain the liquid forming material and the separating liquid, and the separating liquid with the larger specific density sinks between the bottom of the tank and the liquid forming material with the smaller specific density. Thus, the separating liquid may separate the liquid forming material from the bottom of the tank, so as to prevent the cured liquid forming material from adhering on the bottom of the tank and further influencing the subsequent forming results. Moreover, another three-dimensional printing apparatus of the invention uses the tank to contain the liquid forming material and the separating liquid, and the liquid forming material with the larger specific density sinks between the bottom of the tank and the separating liquid with the smaller specific density. Thus, the separating liquid may separate the liquid forming material from the air, so as to prevent the liquid forming material from contacting with the air and generating viscosity on the liquid surface and thereby further influencing the subsequent forming results, and also to prevent the odor of the liquid forming material from dissipating to the outside. In addition, since the detecting unit may detect the liquid level position, the control unit may control the initial depth at which the moving platform immerses into the liquid forming material according to the detection results. Moreover, the separating liquid and the liquid forming material may automatically be injected into the tank via the injection module according to the detection results. Therefore, the three-dimensional printing apparatus of the invention has favorable printing quality.

It will be apparent to those skilled in the art that various modifications and variations can be made to the structure of the application without departing from the scope or spirit of the application. In view of the foregoing, it is intended that the application cover modifications and variations of this application provided they fall within the scope of the following claims and their equivalents.

What is claimed is:

1. A three-dimensional printing apparatus, comprising:
   a tank, filled with a liquid forming material and a separating liquid, wherein a specific density of the separating liquid is larger than a specific density of the liquid forming material, and the separating liquid and the liquid forming material are substantially immiscible with each other, so that the separating liquid sinks between the bottom of the tank and the liquid forming material;
   a moving platform, movably disposed above the tank;
   a light source, disposed below the tank so as to irradiate the liquid forming material;
   a detecting unit, comprising an optical element disposed at a side of the tank, and adapted to move along an axial direction and to emit a ray of light towards the separating liquid and the liquid forming material, the axial direction is perpendicular to the junction between the separating liquid and the liquid forming material, and the light is parallel to the junction, so as to detect a junction between the separating liquid and the liquid forming material through the reflection of the light; and
   a control unit, coupled to the light source, the detecting unit and the moving platform, wherein the control unit controls an initial depth at which the moving platform immerses into the liquid forming material, according to the junction detected by the detecting unit, the control unit controls the moving platform to move from the initial depth in the liquid forming material layer by layer towards a direction away from the light source, and controls the light source to irradiate the liquid forming material, so as to cure the irradiated liquid forming material layer by layer, thereby forming a three-dimensional object on the moving platform.

2. The three-dimensional printing apparatus as recited in claim 1, further comprising:
   a first injection module, connected to the tank, so as to inject a certain amount of the separating liquid into the tank, and when a liquid level position of the separating liquid is lower than a preset value, the control unit controls the first injection module to inject the separating liquid into the tank; and
   a second injection module, connected to the tank, so as to inject a certain amount of the liquid forming material into the tank, and when a liquid level position of the liquid forming material is lower than a preset value, the control unit controls the second injection module to inject the liquid forming material into the tank.

3. The three-dimensional printing apparatus as recited in claim 2, wherein the first injection module has a first injection opening, the second injection module has a second injection opening, the first injection opening and the second injection opening are respectively connected with the tank, and a relative distance from the first injection opening to the bottom of the tank is smaller than a relative distance from the second injection opening to the bottom of the tank.

4. The three-dimensional printing apparatus as recited in claim 1, wherein the detecting unit comprises an ultrasonic element disposed below the tank, the ultrasonic element is adapted to emit an ultrasonic wave along an axial direction and towards the separating liquid and the liquid forming material, and the axial direction is perpendicular to the junction between the separating liquid and the liquid forming material, so as to detect the junction through the reflection of the ultrasonic wave.

5. The three-dimensional printing apparatus as recited in claim 1, wherein the detecting unit comprises a floating ball disposed within the tank, a specific density of the floating ball ranges between the specific density of the separating liquid and the specific density of the liquid forming material, and the floating ball is adapted to float between the separating liquid and the liquid forming material, so as to detect the junction between the separating liquid and the liquid forming material through a floating position of the floating ball.

6. The three-dimensional printing apparatus as recited in claim 1, wherein the liquid forming material comprises a photosensitive resin, and the separating liquid comprises saline water.

7. The three-dimensional printing apparatus as recited in claim 1, wherein the moving platform is adapted to move in relative to the tank along an axial direction, the axial direction is perpendicular to the junction between the separating liquid and the liquid forming material, and the control unit uses the junction as the initial depth at which the moving platform immerses into the liquid forming material.

8. A three-dimensional printing apparatus, comprising:
a tank, filled with a liquid forming material and a separating liquid, wherein a specific density of the liquid forming material is larger than a specific density of the separating liquid, and the separating liquid and the liquid forming material are substantially immiscible with each other, so that the liquid forming material sinks between the bottom of the tank and the separating liquid;
a moving platform, movably disposed above the tank;
a light source, disposed above the tank so as to irradiate the liquid forming material;
a detecting unit, comprising an optical element disposed at a side of the tank, and adapted to move along an axial direction and to emit a ray of light towards the separating liquid and the liquid forming material, the axial direction is perpendicular to the junction between the separating liquid and the liquid forming material, and the light is parallel to the junction, so as to detect a junction between the separating liquid and the liquid forming material through the reflection of the light; and
a control unit, coupled to the light source, the detecting unit and the moving platform, wherein the control unit controls an initial depth at which the moving platform immerses into the liquid forming material according to the junction detected by the detecting unit, the control unit controls the moving platform to move from the initial depth in the liquid forming material layer by layer towards a direction away from the light source, and controls the light source to irradiate the liquid forming material, so as to cure the irradiated liquid forming material layer by layer, thereby forming a three-dimensional object on the moving platform.

9. The three-dimensional printing apparatus as recited in claim 8, further comprising:
a first injection module, connected to the tank, so as to inject a certain amount of the separating liquid into the tank, and when a liquid level position of the separating liquid is lower than a preset value, the control unit controls the first injection module to inject the separating liquid into the tank; and
a second injection module, connected to the tank, so as to inject a certain amount of the liquid forming material into the tank, and when a liquid level position of the liquid forming material is lower than a preset value, the control unit controls the second injection module to inject the liquid forming material into the tank.

10. The three-dimensional printing apparatus as recited in claim 9, wherein the first injection module has a first injection opening, the second injection module has a second injection opening, the first injection opening and the second injection opening are respectively connected with the tank, and a relative distance from the first injection opening to the bottom of the tank is larger than a relative distance from the second injection opening to the bottom of the tank.

11. The three-dimensional printing apparatus as recited in claim 8, wherein the detecting unit comprises an ultrasonic element disposed below the tank, the ultrasonic element is adapted to emit an ultrasonic wave along an axial direction and towards the separating liquid and the liquid forming material, and the axial direction is perpendicular to the junction between the separating liquid and the liquid forming material, so as to detect the junction through the reflection of the ultrasonic wave.

12. The three-dimensional printing apparatus as recited in claim 8, wherein the detecting unit comprises a floating ball disposed within the tank, a specific density of the floating ball ranges between the specific density of the separating liquid and the specific density of the liquid forming material, and the floating ball is adapted to float between the separating liquid and the liquid forming material, so as to detect the junction between the separating liquid and the liquid forming material through a floating position of the floating ball.

13. The three-dimensional printing apparatus as recited in claim 8, wherein the liquid forming material comprises a photosensitive resin, and the separating liquid comprises water.

14. The three-dimensional printing apparatus as recited in claim 8, wherein the moving platform is adapted to move in relative to the tank along an axial direction, the axial direction is perpendicular to the junction between the separating liquid and the liquid forming material, and the control unit uses the junction as the initial depth at which the moving platform immerses into the liquid forming material.

* * * * *